Figure 1:
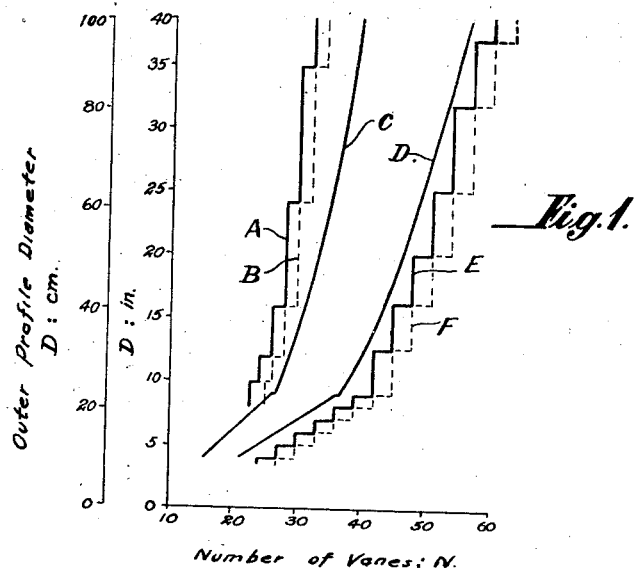

Nov. 10, 1942. H. SINCLAIR 2,301,645
HYDRAULIC COUPLING
Filed April 2, 1941 4 Sheets-Sheet 1

Nov. 10, 1942.    H. SINCLAIR    2,301,645
HYDRAULIC COUPLING
Filed April 2, 1941    4 Sheets-Sheet 2

Inventor
Harold Sinclair
by
Dean Fairbank & Hirsch
his Attorneys

Nov. 10, 1942.                H. SINCLAIR                    2,301,645
                           HYDRAULIC COUPLING
                           Filed April 2, 1941          4 Sheets-Sheet 3
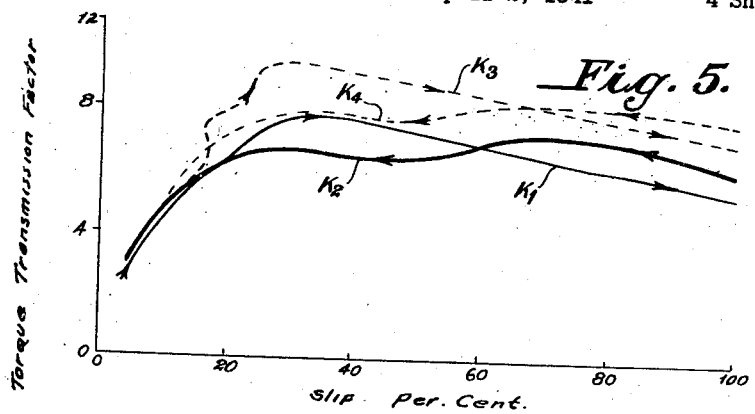
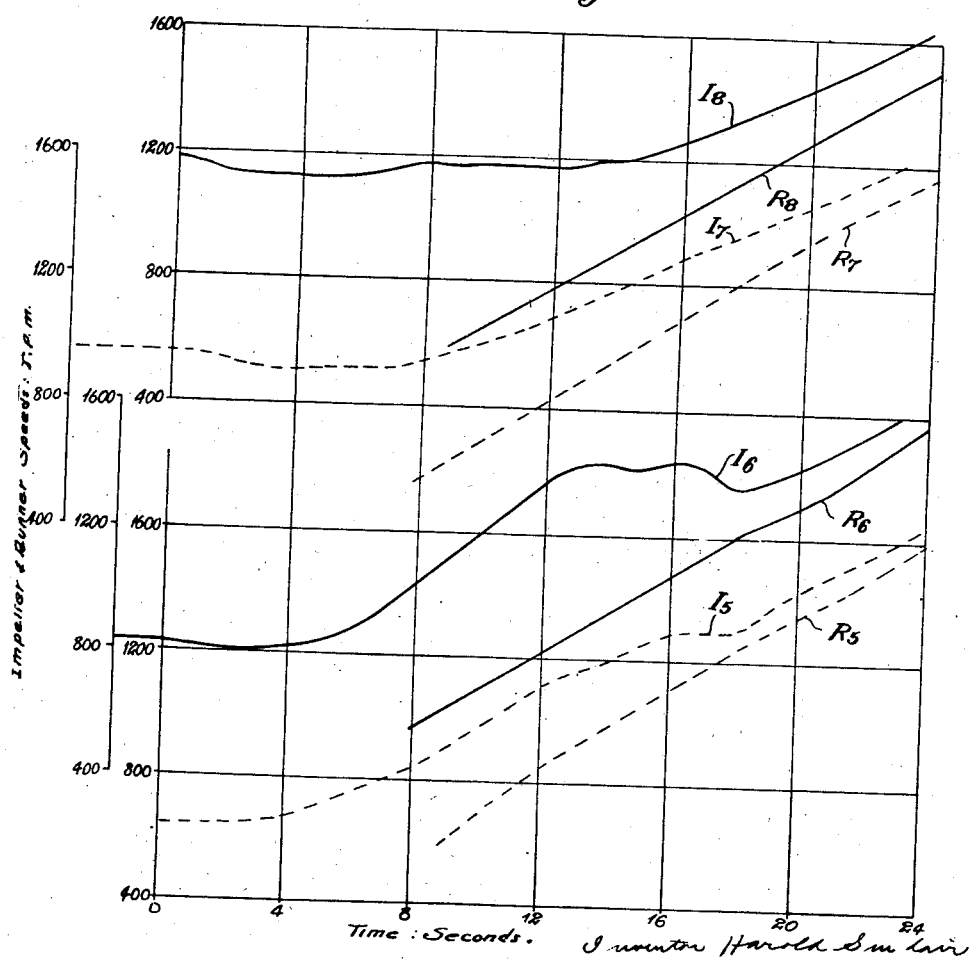

Nov. 10, 1942.                H. SINCLAIR                 2,301,645
                          HYDRAULIC COUPLING
                          Filed April 2, 1941              4 Sheets—Sheet 4
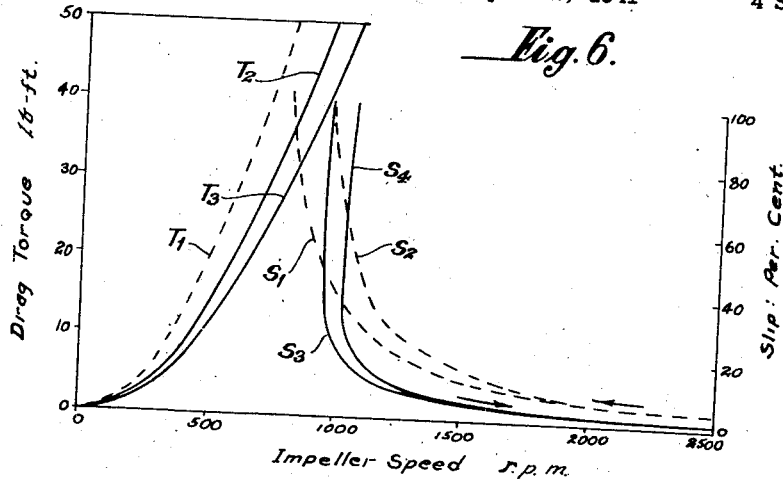
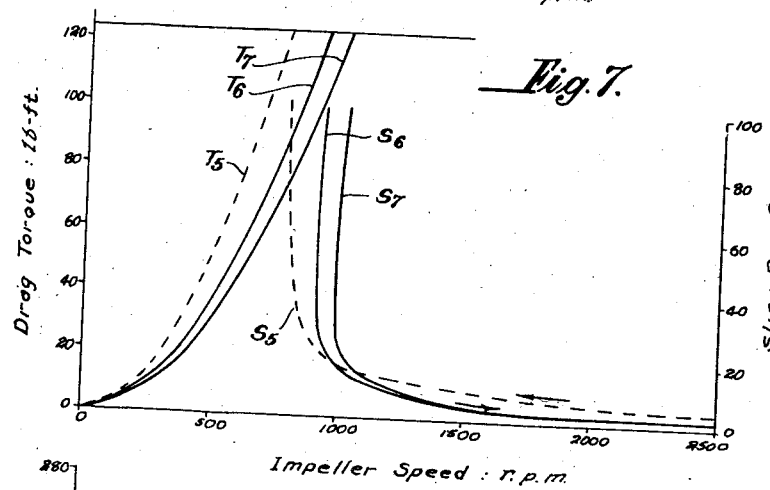
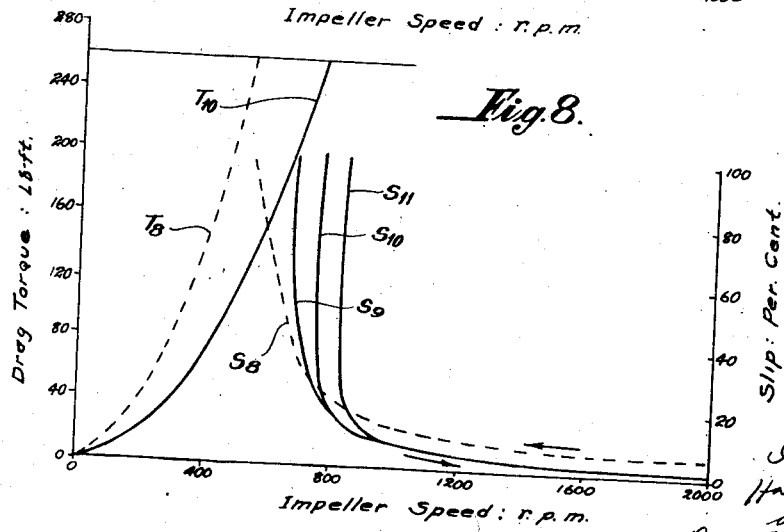

Patented Nov. 10, 1942

2,301,645

UNITED STATES PATENT OFFICE 2,301,645

HYDRAULIC COUPLING

Harold Sinclair, Kensington, London, England

Application April 2, 1941, Serial No. 386,391
In Great Britain April 17, 1940

13 Claims. (Cl. 60—54)

This invention relates to hydraulic couplings of the kinetic type. It is especially, but not exclusively, concerned with such couplings which are intended to operate at all times with a substantial quantity of working liquid in the working circuit, and preferably with a reservoir space having a capacity which is relatively small compared with that of the working circuit, the arrangement being such that liquid is transferred between the reservoir space and the working circuit automatically in accordance with variations in the operating conditions. The reservoir space, when provided, is preferably included within the rotary parts of the coupling, although it may be provided by a stationary chamber connected to the coupling by a duct.

In many applications of such hydraulic couplings, such as for traction purposes with internal-combustion engines or electric motors, and on cranes, excavators and like machinery, and in stationary plant for internal-combustion and electric motor drives, certain conflicting characteristics are desirable.

The first desirable characteristic quality is that the slip shall be low, and the power transmission efficiency consequently high, at normal running speeds even under high torques.

Secondly, that the drag torque shall be low, that is the torque transmission capacity when the runner is stalled. For example, in the case of a vehicle drive, it is desirable that the drag torque should be low when the internal-combustion engine is idling with the gear engaged, so that there is only a small creeping tendency. Similarly, if the coupling is used to facilitate the starting of a squirrel-cage electric motor when connected by the coupling to a load requiring a high starting torque, it is necessary that the stalled torque of the coupling should not ordinarily exceed about twice the rated full-load torque at a motor speed of the order of 90% of synchronous speed.

Thirdly, it is very important that once the runner has begun to rotate when being accelerated from rest against the load, the slip shall decrease rapidly. In other words for example in a full-size passenger motor-car the slip should fall rapidly to a low value when transmitting the torque of the engine at full throttle in the most frequently used part of the full-torque acceleration range which in such a vehicle ordinarily extends from about 900 to 1800 R. P. M. of the engine.

Fourthly, that the torque-transmission capacity of the coupling should not attain an excessively high value, as compared with the normal full-load torque, when both the impeller speed and the slip are high, in other words the coupling shall have satisfactory torque-limiting qualities.

The main object of this invetnion is to provide a hydraulic coupling which has, in combination, in particular the first three of the above-mentioned desirable though conflicting characteristics, and which nevertheless is low in production cost, and is simple, compact and reliable, being adapted to operate automatically and not requiring the complication of control mechanism, such as a centrifugal governor or a slidable hydraulic element.

According to this invention a hydraulic coupling of the kinetic type includes an annular working circuit which is formed by the impeller and runner elements and in which the working liquid can circulate in the form of a vortex ring, this circuit being free from annular members in its interior, shaped to guide the circulation of the liquid, and the said elements each having a number of vanes not less than is given by either of the formulas: $N=14.67D^{0.27}$, where D is the outer profile diameter of the working circuit in inches and ranges from 9 inches upwards (or $N=11.4D^{0.27}$, where D is in centimetres and ranges from 23 cm. upwards), and $N=8+2D$ where D is in inches and ranges from 9 inches downwards (or $N=8+0.79D$ where D is in centimetres and ranges from 23 cm. downwards), the coupling also including a deflector on the boundary of the working circuit adapted to interrupt the flow of the vortex ring of liquid in the neighbourhood of its boundary.

For practical reasons concerned with manufacture, the number of vanes it is convenient to provide in the elements of a hydraulic coupling decreases with reduction in the size of coupling, and in order to promote smoothness of running it is customary to arrange for a small difference in the numbers of vanes in the impeller and the runner respectively.

Fig. 1 of the accompanying drawings shows numbers of vanes as abscissa to size of coupling as defined by outer profile diameter in inches and centimetres as ordinate. Lines A and B give the number of vanes used respectively on the impeller and the runner of standard Vulcan and Vulcan-Sinclair couplings having a high efficiency working circuit with core guide rings of customary proportions. Curve C gives the minimum number of vanes on either element as determined by the formulas hereinbefore set forth. The most satisfactory results are secured by using a larger number of vanes in the improved couplings, and curve D gives the preferred minimum number of vanes on either element, the formulas for this curve being: $N=19.4D^{0.29}$, where D is in inches and ranges from 9 inches upwards (or $N=14.8D^{0.29}$, where D is in centimetres and ranges from 23 cm. upwards), and $N=9+3D$, where D is in inches and ranges from 9 inches downwards (or $N=9+1.18D$, where D is in centimetres and ranges from 23 cm. downwards). Lines E and F indicate the recommended numbers of vanes on the impeller and runner when these elements are castings. The number of vanes on each element is conveniently arranged to be a multiple of three, and to prevent encroachment on the liquid passages near the axis of rotation, two out of every three adjacent vanes are cut away here, so that two short vanes alternate with one long vane. One vaned element conveniently has three more vanes than the other, and these recommended numbers of vanes lie within a range of between 1 and 9 more than the value given by curve D. The recommended numbers of vanes accordingly lie within either of the ranges $N=10+3D$ to $N=18+3D$ where D is in inches and does not exceed 9, and $N=1+19.4D^{0.29}$ to $N=9+19.4D^{0.29}$ where D exceeds 9 inches. The maximum number of vanes that can be usefully provided is determined by practical questions of manufacture and cost.

The invention will be further described with reference to Figs. 2 to 9 of the accompanying drawings, in which—

Figure 3:
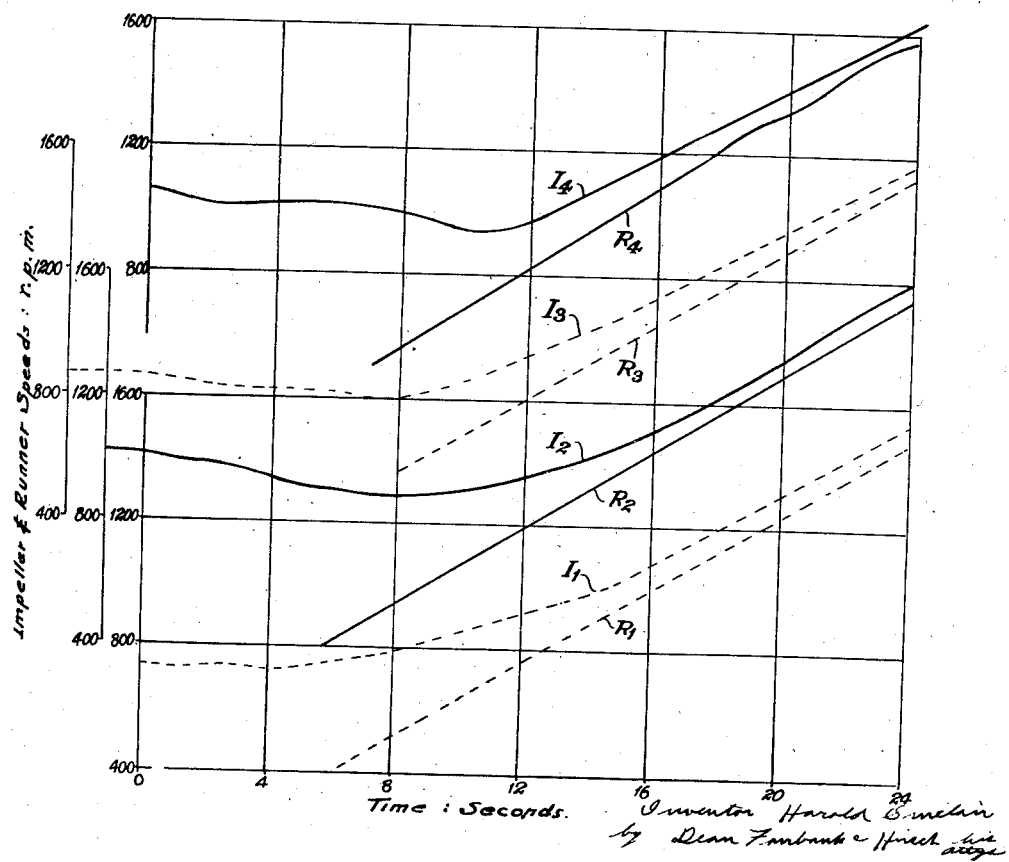
Figure 2:
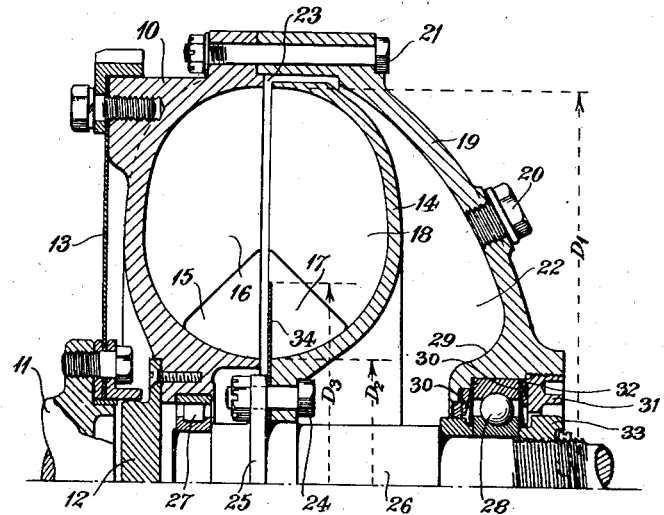

Fig. 2 is a sectional side elevation of part of one type of the improved coupling, Fig. 3 shows speed/time curves of the improved couplings taken under acceleration conditions, Fig. 4 shows corresponding curves of known couplings, Fig. 5 shows the relationship of torque-transmission capacity to slip of the improved couplings.

Figure 9:
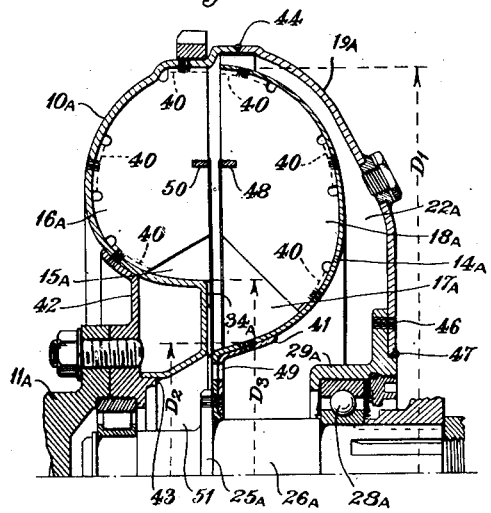

Figs. 6 to 8 compare the torque/speed and slip/speed characteristics of the improved couplings and of known standard couplings, and Fig. 9 is a sectional side elevation of part of another type of the improved coupling.

In the example shown in Fig. 2 the impeller 10 is mounted on a driving shaft 11 in known manner by means of a part-spherical spigot 12 and a flexible diaphragm 13. The runner 14 is juxtaposed to the impeller 10 to form therewith an annular working circuit having a smoothly curved profile. In the example shown the outer profile diameter D1 is 12.75 inches (32.4 cm.) and the inner profile diameter D2 is 3.95 inches (10 cm.). The impeller 10 has forty-eight vanes alternately one long vane 15 and two short vanes 16, and the runner has forty-five vanes alternately one long vane 17 and two short vanes 18. A rotary casing 19, provided with a filling plug 20, is fixed by bolts 21 to the periphery of the impeller 10 and covers the back of the runner 14. The radially outer part of the casing 19 lies close to the back of the runner, while the radially inner part of the casing is spaced from the back of the runner to provide a reservoir space 22 having a capacity of between one-quarter and one-eighth and preferably about one-fifth of that of the working circuit, which communicates with the reservoir space through the gap 23 between the peripheries of the impeller and the runner. The runner is fixed by bolts 24 to a flange 25 on a runner shaft 26 which is journalled at one end by a roller bearing 27 in the hub of the impeller 10. A deep-groove ball-bearing 28 is supported in a housing 29 in the hub of the casing 19 and supports the other end of the shaft 26. On each side of the outer race of the bearing 28 is provided a spring steel diaphragm 30, these diaphragms being clamped with the race by a screwed plug 31. A dished resilient washer 32 is placed between the plug 31 and the adjacent diaphragm 30. The inner edge of each diaphragm 30 is provided with a beading which bears resiliently on the adjacent side of the inner race of the bearing 28, which is clamped on the shaft 26 by a nut 33. The diaphragms co-operate with the bearing to form a gland which prevents leakage of oil from the coupling and ingress of dirt to the bearing.

The deflector in the working circuit consists of a flat annular baffle 34 fixed between the runner and the flange 25 and projecting into the working circuit at the radially innermost part of the circuit. The size of this baffle is conveniently described in proportion to the inner profile diameter. The baffle shown is a "1.5 baffle," its external diameter D3 being 1.5 times the inner profile diameter, namely 5.93 inches (15 cm.). The baffle size, with a circuit having the proportions shown in Fig. 2, in which the ratio D1/D2 is substantially 3.2/1, may range from 1.3 to 1.8, and particularly favourable results are obtained with a size of 1.5 or 1.6. Expressed in another way, the baffle may project into the working circuit to a distance ranging from 13½ to 36 per cent of the difference between the inner and outer profile radii, the particularly favourable results being obtained when the figure is 22½ to 27 per cent.

This example has a greatly improved slip characteristic in the full-torque acceleration range, previously referred to, as compared with known couplings, not only when the coupling has what is ordinarily regarded as a normal liquid content, but particularly when the filling is considerably reduced, and in the latter case the slip at full speed is at least as low as that of the best known couplings, while the idling drag torque and the slip in the full-torque acceleration range are both very substantially reduced. This is a particularly favourable result, since if known couplings are arranged to yield the desirable feature of a low drag torque, the slip is undesirably high for a substantial way up the acceleration range, even although the slip at higher running speed is satisfactorily low.

A further important advantage of the new coupling is its improved performance with an abnormally small liquid content, as compared with known couplings having the same outer profile diameter which enables the expansion of the working liquid and contained air as the coupling temperature rises in use to be accommodated without the need for an excessively large expansion space outside the working circuit. In consequence the coupling can be relatively short and light.

Fig. 3 shows the results of test carried out with the coupling shown in Fig. 2. In these tests the coupling was employed to couple a petrol engine, yielding a torque of between 90 and 100 lb.-ft. (12.5 and 14 kg.-m.) to a heavy flywheel provided with a disengageable brake. The brake was applied to hold the flywheel stationary and the engine was run at full torque, the slip in the coupling being 100 per cent. The brake was then released, and, as the flywheel accelerated, the speeds of the engine and of the flywheel were electrically recorded at intervals of one-tenth second. These speeds are plotted as ordinates on a time base of seconds.

Curves I1 and R1 show respectively the engine (impeller) speed and the flywheel (runner) speed when the coupling was provided with a 1.4 size baffle. The quantity of liquid in the coupling was what is termed a 19-degree filling. That is to say, the maximum that could be inserted when the axis of rotation was horizontal and the impeller was so placed that the hole for the filling plug 20 lay on a radius inclined at 19 deg. to the vertical. These curves show that the drag torque was reasonably low, since the engine speed when the coupling was stalled was as high as 740 R. P. M. Furthermore as the flywheel accelerated, the slip dropped to a very low value before the engine speed exceeded 1000 R. P. M.

Curves I2 and R2 of Fig. 3, which relate to the same coupling with the 1.4 size baffle but with a 50-degree filling (i. e., such that only about three-quarters of the total internal space of the coupling contained liquid) show particularly valuable characteristics. The engine speed at full torque with the flywheel braked was as high as 1000 R. P. M. indicating a very low drag torque. On release of the flywheel brake the rise in torque transmission capacity was so rapid that the engine speed at full throttle was pulled down to a minimum of 890 R. P. M., and when the engine had again accelerated to 1000 R. P. M., 13 seconds after the flywheel had started, the slip was only 15 per cent., and after 22 seconds at 1500 R. P. M. of the engine at full throttle the slip had dropped to the very low figure of 2.67 per cent.

Curves I3 and R3 of Fig. 3 show the results of a test of the same coupling fitted with a 1.6 size baffle and having a "19-degree" filling. In this test the engine speed at full torque with 100 per cent. slip was 870 R. P. M., as compared with 740 R. P. M., with the 1.4 size baffle, while after the runner speed had attained 800 R. P. M., the slip was not appreciably higher than with the 1.4 size baffle. Curves I4 and R4 relate to a 1.6 size baffle and a "50-degree" filling. These curves are very similar to curves I2 and R2 for the same filling and a 1.4 size baffle, the engine speed at full torque with 100 per cent slip being 1060 R. P. M.

Fig. 4, which corresponds to Fig. 3 shows the results of similar tests made on the previously known standard Vulcan-Sinclair traction-type coupling also having an outer profile diameter of 12.75 inches. Curves I5 and R5 relate to this coupling with no baffle and a "19-degree" filling and curves I6 and R6 relate to the same coupling but with a "50-degree" filling. Even in the latter test the speed of the engine at full torque and 100 per cent slip was only 840 R. P. M. which indicates a relatively high idling drag torque; and moreover in both tests and particularly in the latter the slip over the acceleration range was excessive up to 1250 R. P. M. of the runner. Curves I7 and R7 relate to this coupling with a 1.4 size baffle and a "19-degree" filling, while curves I8 and R8 relate to the same coupling with a "50-degree" filling. While in these two tests the presence of the baffle had raised the engine speed at full throttle and 100 per cent. slip to satisfactory figures, it was at the expense of a high slip in the latter part of the acceleration range as may be seen by comparing with the slips recorded in Fig. 3.

Fig. 5 gives the torque transmission factor K (a non-dimensional quantity employed for purposes of comparison of different couplings) of the coupling shown in Fig. 2 when tested under the torque load such as it would ordinarily be used for in automobile practice, and when fitted with a 1.5 size baffle, this factor being plotted as ordinate against percentage slip as abscissa. Curve K1 shows the variation of K with a "50-degree" filling as the coupling runner is gradually stalled with the impeller speed falling while the torque remains constant; and curve K2 is the corresponding characteristic for the condition of accelerating the load from stand-still by means of an internal-combustion engine. The curve K1 rises from zero to a peak values at a slip of about 30 per cent. and then falls quite markedly to the stalling point, this humped shape being a desirable feature. The curve K2 in the region between 20 per cent. and minimum slip is practically identical with the curve K1, and furthermore the torque transmission factor is maintained at a substantially uniformly high value in the range between 100 and 20 per cent. slip, which is an important and valuable feature of the improved coupling. Curves K3 and K4 of Fig. 5 relate to the same coupling with a "30-degree" filling. They have the same desirable characteristic features as the curves K1 and K2. The curves K1 and K3 were obtained by starting the test with the coupling cold, and by the time the slip had risen to 100 per cent. the coupling temperature had risen substantially. The curves K2 and K4 were obtained by starting the tests with the coupling hot. The slight differences in the K values of the two curves for each degree of filling at 100 per cent. slip are due to differences of temperature of the coupling.

Fig. 6 compares the drag torque in lb.-ft. and percentage slip, plotted as ordinate, against impeller speed as abscissa, under a constant engine torque of 50 lb.-ft. of the improved coupling shown in Fig. 2 and a known standard hydraulic coupling at present on the market, the outer profile diameter in each case being 11.5 inches (26.5 cm.). Curves T1 and T2 show the drag torque of the known coupling having respectively its normal liquid content and a reduced liquid content. Curves S1 and S2 are the corresponding slip curves, obtained at contant torque with decreasing impeller speed. Curves T2 and T3 show the drag torques of the improved coupling with "30-degree" and "50-degree" fillings respectively, and the corresponding slip curves are S3 and S4, which were obtained, unlike the curves S1 and S2, under acceleration conditions, which are more exacting in the demands on the coupling. The improved coupling shows a reduction in drag torque of about one-third, and a reduction in slip of more than one-half, as compared with the known coupling.

Fig. 7 is a comparison, similar to Fig. 6, between another known standard hydraulic coupling and the improved coupling, both having an outer profile diameter of 14 inches (35.6 cm.), the engine torque being 210 lb.-ft. Curves T5 and S5 relate to the known coupling, curves T6 and S6 to the improved coupling with the "30-degree" filling and curves T7 and S7 to the improved coupling with "50-degree" filling. Slip curves S6 and S7 were also obtained under the more exacting acceleration conditions. In this case the improvements according to the invention have reduced the drag torque by about one-third and the slip by about two-thirds on a coupling of the same outer profile diameter.

Fig. 8 similarly compares yet another known standard hydraulic coupling having an outer profile diameter of 16 inches (40.5 c. m.) with the improved coupling of the same size, under an engine torque of 260 lb.-ft. Curves T8 and S8 relate to the known coupling; curves S9, S10 and S11 relate to the improved coupling with "20-degree," "30-degree" and "50-degree" fillings, and curve T10 is the drag torque curve of the improved coupling with a "30-degree" filling. The improved coupling halves the drag torque and also reduces the average slip by one-half.

A remarkable feature of the slip curves of the improved couplings in Figs. 6, 7 and 8 is the drop, on acceleration, from 100 per cent. slip to a value as low as 20 per cent. with "50-degree" filling before the engine speed begins to exceed the value it had when the slip was 100 per cent., and thereafter a reasonably rapid reduction in slip to a very low value. This feature yields a substantial economy in fuel consumption of vehicles that have to be frequently started and stopped, without in any way impairing the performance of the vehicle. Likewise in the case of governed internal-combustion engines the idling fuel consumption is reduced by the drop in drag torque.

Tests of the improved coupling under acceleration conditions with baffle sizes up to 1.8 and fillings reduced to three-quarters show that the improved characteristics are maintained with reduction in drag torque, though the slip is slightly increased as the baffle size approaches the 1.8 value.

Another example of the improved coupling, made largely of steel pressings welded together, is shown in Fig. 9. This coupling has the same profile diameters and the same numbers of impeller and runner vanes as the coupling shown in Fig. 2. The runner 14A is proportioned similarly to that shown in Fig. 2, but is not provided with a baffle. The runner vanes 17A and 18A are provided with integral lugs 40 which are spot welded to the pressed steel shell of the runner, and they are braced together by means of a stiffening ring 48 to which they are welded. The section of the ring 48 is so small that it has no appreciable guiding effect on the vortex flow. The hub of the runner shell is reinforced by a pressed steel ring 41 and spot welded to a flange 25A on the runner shaft 26A. The impeller 10A has a hub of relatively increased diameter so arranged that its end face 34A forms the deflector for diverting the outer layer of the liquid vortex radially outwards as it leaves the runner. The circuit boundary of the impeller curves gradually outwards from the outer edge of the face 34A. Apertures such as 49 are formed in the ring 41 and in the hub of the runner shell so as to put the space 51 within the hub of the impeller shell into communication with the reservoir space 22A provided between the rotary casing 19A and the runner shell.

The impeller vanes 15A and 16A have lugs 40 welded to the impeller shell which is spot welded to a flanged boss 42 to which the driving shaft 11A is secured. The vanes 15A and 16A are braced together by means of a stiffening ring 50 to which they are welded and which, like the ring 48, has a section so small that it has no appreciable guiding effect on the vortex flow. The inner edge of the impeller shell is secured to the boss 42 by a continuous welded seam 43.

The rotary casing 19A, which is welded at 44 to the impeller shell, is also welded at 46 and 47 to a flanged hub 29A which projects into the middle of the reservoir space 22A and forms a housing for a runner-shaft bearing 28A and diaphragm glands disposed somewhat similarly to the corresponding parts in Fig. 2. This arrangement secures a substantial reduction in the length of the coupling, as compared with the standard Vulcan-Sinclair traction-type coupling, and at the same time yields the improved characteristics hereinbefore set out.

I claim:

1. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where $D$ does not exceed 9, and $N=14.67D^{0.27}$ where $D$ exceeds 9, $N$ denoting the number of vanes and $D$ the outer profile diameter of the working circuit in inches, the coupling also including a deflector on the boundary of the working circuit positioned to interrupt the flow of the vortex ring of liquid in the neighbourhood of its boundary.

2. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=9+3D$ where $D$ does not exceed 9, and $N=19.4D^{0.29}$ where $D$ exceeds 9, $N$ denoting the number of vanes and $D$ the outer profile diameter of the working circuit in inches, the coupling also including a deflector on the boundary of the working circuit positioned to interrupt the flow of the vortex ring of liquid in the neighbourhood of its boundary.

3. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes lying within the ranges $N=10+3D$ and $N=18+3D$, where $D$ does not exceed 9, and $N=1+19.4D^{0.29}$ and $N=9+19.4D^{0.29}$ where $D$ exceeds 9, $N$ denoting the number of vanes and $D$ the outer profile diameter of the working circuit in inches, the coupling also including a deflector on the boundary of the working circuit positioned to interrupt the flow of the vortex ring of liquid in the neighbourhood of its boundary.

4. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes lying within the ranges $N=10+3D$ and $N=18+3D$, where $D$ does not exceed 9, and $N=1+19.4D^{0.29}$ and $N=9+19.4D^{0.29}$ where $D$ exceeds 9, $N$ denoting the number of vanes and $D$ the outer profile diameter of the working circuit in inches, the vanes on each of said elements numbering a multiple of three and consisting of one long vane alternating with two short vanes, the coupling also including a deflector on the boundary of the working circuit positioned to interrupt the flow of the vortex ring of liquid in the neighbourhood of its boundary.

5. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formula: $N=9+3D$ where D does not exceed 9, and $N=19.4D^{0.29}$ where D exceeds 9, the number of vanes on each of said elements being a multiple of three and the number of vanes on one of said elements exceeding the number of vanes on the other of said elements by three, the coupling also including a deflector on the boundary of the working circuit positioned to interrupt the flow of the vortex ring of liquid in the neighbourhood of its boundary.

6. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector on the boundary of the working circuit positioned to interrupt the flow of the vortex ring of liquid in the neighbourhood of its boundary, said deflector being disposed on the part of the boundary of the working circuit nearest to the axis of rotation of the coupling and having an external diameter exceeding 1.4 times the inner profile diameter of the working circuit, the ratio of the outer to the inner profile diameter being substantially 3.2/1.

7. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector on the boundary of the working circuit positioned to interrupt the flow of the vortex ring of liquid in the neighbourhood of its boundary, said deflector being disposed on the part of the boundary of the working circuit nearest to the axis of rotation of the coupling and having an external diameter of between 1.5 and 1.6 times the inner profile diameter of the working circuit, the ratio of the outer to the inner profile diameter being substantially 3.2/1.

8. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector on the boundary of the working circuit positioned to interrupt the flow of the vortex ring of liquid in the neighbourhood of its boundary, said deflector being disposed on the part of the boundary of the working circuit nearest to the axis of rotation of the coupling and projecting into the working circuit to a distance exceeding 17.5 per cent. of the difference between the inner and outer profile radii of the working circuit.

9. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector on the boundary of the working circuit positioned to interrupt the flow of the vortex ring of liquid in the neighbourhood of its boundary, said deflector being disposed on the part of the boundary of the working circuit nearest to the axis of rotation of the coupling and projecting into the working circuit to a distance ranging between 22½ and 27 per cent. of the difference between the inner and outer profile radii of the working circuit.

10. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector on the boundary of the working circuit positioned to interrupt the flow of the vortex ring of liquid in the neighbourhood of its boundary and a rotary casing attached to the periphery of one of said elements and spaced from the back of the other of said elements to form a reservoir space having a capacity of between one-quarter and one-eighth of the volume of the working circuit.

11. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, said impeller having a hub the diameter of which exceeds the inner profile diameter of the runner and an end face of which forms a deflector having a diameter exceeding 1.4 times the inner profile diameter of the runner, the ratio of the outer to the inner profile diameter of the runner being substantially 3.2/1.

12. A hydraulic coupling of the kinetic type including an annular working circuit which is formed by an impeller element and a runner element and in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the said impeller having a hub the diameter of which exceeds the inner profile diameter of the working circuit and an end face of which forms a deflector projecting into the working circuit to a distance exceeding 17.5 per cent. of the difference between the inner and outer profile radii of the runner.

13. A hydraulic coupling of the kinetic type including an impeller element and a runner element together forming a working circuit in which the working liquid can circulate in the form of a vortex ring, this circuit being free from annular members in its interior shaped to guide the circulation of liquid, and the said elements each having a number of vanes not less than is given by the formulas: $N=8+2D$ where D does not exceed 9, and $N=14.67D^{0.27}$ where D exceeds 9, N denoting the number of vanes and D the outer profile diameter of the working circuit in inches, the coupling also including a deflector or the boundary of the working circuit position to interrupt the flow of the vortex ring of liquid in the neighborhood of its boundary, said deflector being disposed on the part of the boundary of the working circuit nearest to the axis of rotation of the coupling and projecting radially outwards of the inner profile radius of said runner to a distance not less than 17½ per cent. of the difference between said radius and the outer profile radius of said working circuit, and a rotary casing attached to the periphery of one of said elements and spaced from the back of the other of said elements to form a reservoir space having a capacity of between one-quarter and one-eighth of the volume of said working circuit.

HAROLD SINCLAIR.